Mar. 13, 1923.

S. B. GORBUTT

VALVE

Filed June 25, 1919

1,448,291

Inventor
Sidney B. Gorbutt
By
Attorney

Patented Mar. 13, 1923.

1,448,291

UNITED STATES PATENT OFFICE.

SIDNEY B. GORBUTT, OF PORTLAND, OREGON.

VALVE.

Application filed June 25, 1919. Serial No. 306,706.

*To all whom it may concern:*

Be it known that I, SIDNEY B. GORBUTT, a subject of the King of Great Britain, residing at Portland, in the county of Multnomah and State of Oregon, have invented new and useful Improvements in Valves, of which the following is a specification.

The valve is particularly designed for use as a throttle valve. Here it is desirable to have the valve operate easily and with slight travel so that the leverages of the mechanism for operating it may be as great as possible.

The invention is illustrated in the accompanying drawings as follows:—

Figure 1:
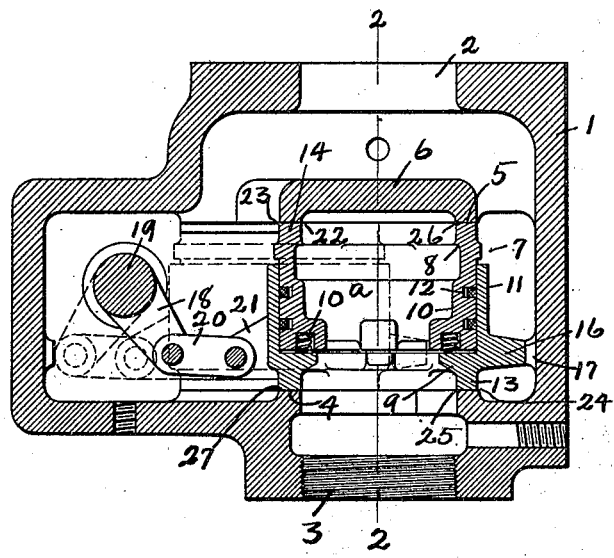
Figure 2:
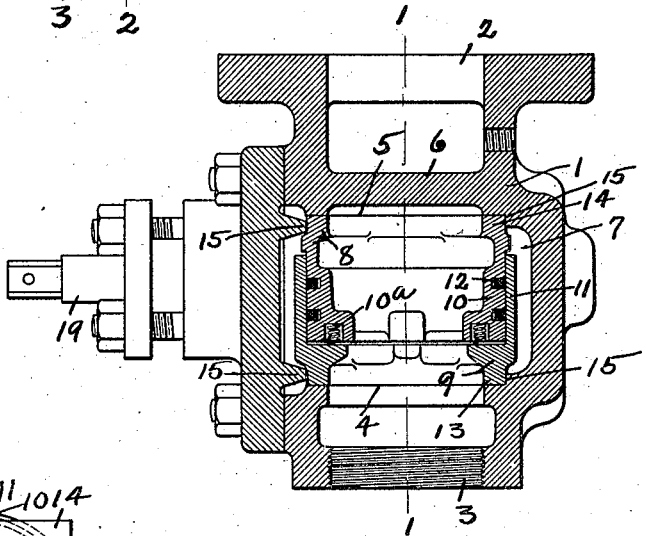

Fig. 1 shows a section on the line 1—1 in Fig. 2.

Fig. 2 a section on the line 2—2 in Fig. 1.

Figure 3:
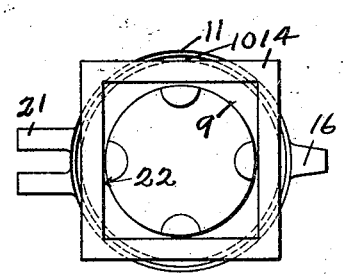

Fig. 3 a plan view of the valve removed from the body.

1 marks the body of the valve, 2 the inlet and 3 the outlet as ordinarily used. Valve seats 4 and 5 are opposingly placed, the valve seat 5 being arranged in a bridge 6 extending across the body. A valve 7 operates between these faces. It is preferably made up of telescoping parts 8 and 9, the part 8 having a cylindrical central portion 10 operating in a cylindrical central portion 11 of the part 9. Rings 12 are provided for more effectively closing the joint between the telescoping surfaces and springs 10$^a$ give an initial contact to the valve faces on the valve seat. The seat portions, or ends 13 and 14 of the valve are rectangular in form as clearly shown in Fig. 3 and the surfaces are such as to give a slight preponderance of pressure on the parts of the valve against the seat so as to assure a closure. In the structure shown the corners of the parts extend beyond the cylindrical portions and these corners are subjected to pressure on the surfaces opposite the seats and this pressure being unopposed on the seat side it follows that this pressure tends to hold the parts to their seats. The rectangular portions operate between guides 15 at the sides of the body and the travel of the valve is limited by a stop 16 on the valve engaging a stop 17 on the body. The valve has an opening through it for the passage of steam, or other fluid.

The valve is operated by a rocker arm 18 carried by a shaft 19, the shaft extending through the walls of the body so as to be operated from without the body. The rocker arm is connected by a link 20 with projections 21 on the valve.

A closing edge 22 along the edge of the opening of the valve co-acts with a closing edge 23 on the seat 5 so that when the valve is moved to the left to the position shown in dash lines steam is admitted between these closing edges from the body or chamber to the opening through the valve, thus discharging to the outlet passage 3. A closing edge 24 on the part 9 of the valve operates with a closing edge 25 on the seat 4 so that when the valve is turned to the left as shown in dash lines steam passes directly from the body to the outlet passage 3.

There may be some steam admitted past the closing edges 26 and 27 in the manner of double ported valves but the main volume of steam passes in the manner above described.

By passing steam through the valve to the same passage a large and comparatively unobstructed opening may be provided with a very slight travel of the valve. Consequently the rocker arm 18 may be made of comparatively short length and still give sufficient travel to the valve. This with the balanced feature of the valve makes a very quick operating and at the same time very easily operated valve.

What I claim as new is:—

1. The combination of a valve body having inlet and outlet passages and opposing valve seats; and a valve operating on said seats and having an opening therethrough, one face of the valve adapted to open to a passage past its outer end and the opposite face of the valve adapted to open at the opposite end of the valve and through the valve opening to the passage, said valve being formed in two parts, each part having a rectangular seat portion and a cylindrical telescoping portion, the telescoping portions being telescopically arranged and having their axis at right angles to said seats.

2. The combination of a valve body having inlet and outlet passages and opposing valve seats; a valve operating on said seats and having an opening therethrough, one face of the valve adapted to open to a passage past its outer end and the opposite face of the valve adapted to open at the opposite end of the valve and through the valve opening to the passage, said valve being formed in two parts, each part having one of said faces operating on one of said seats and having a cylindrical portion with an axis at right angles to said seats telescoping with the companion part.

3. The combination of a valve body having inlet and outlet passages and opposing valve seats; a valve operating on said seats and having an opening therethrough, one face of the valve adapted to open to a passage past its outer end and the opposite face of the valve adapted to open at the opposite end of the valve and through the valve opening to the passage, said valve being formed in two parts, each part having one of said faces operating on one of said seats and having a cylindrical portion with an axis at right angles to said seats telescoping with the companion part, said valve faces being on rectangular seat portions extending outside of the cylindrical portions and subjected to pressure tending to seat the valve.

In testimony whereof I have hereunto set my hand.

SIDNEY B. GORBUTT.